April 19, 1949. O. C. MARTIN 2,467,533
PILOT VALVE STRUCTURE
Original Filed Sept. 17, 1945 5 Sheets-Sheet 1

INVENTOR.
OTIS C. MARTIN
deceased
BY MARION E. MARTIN
Administratrix
Harold W. Mattingly
Attorney

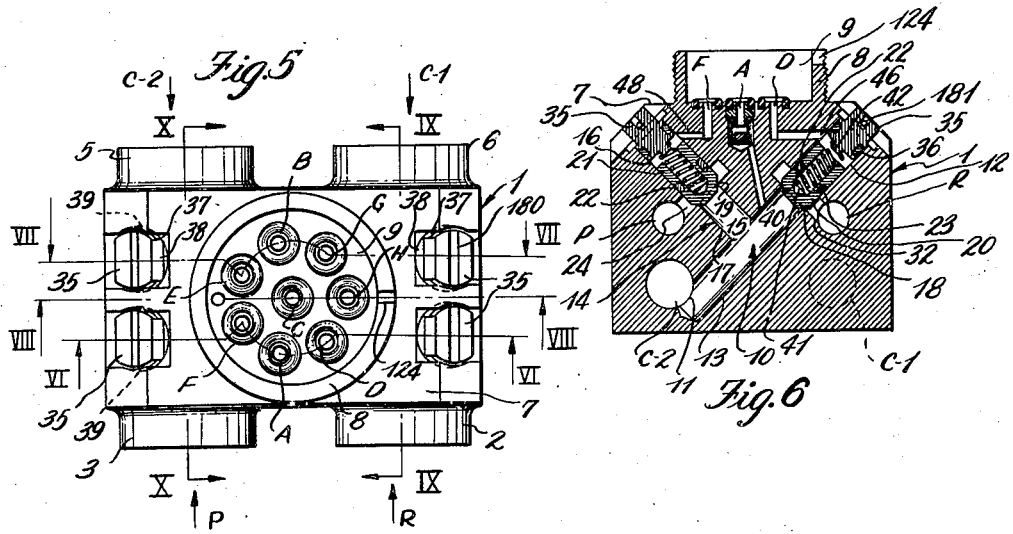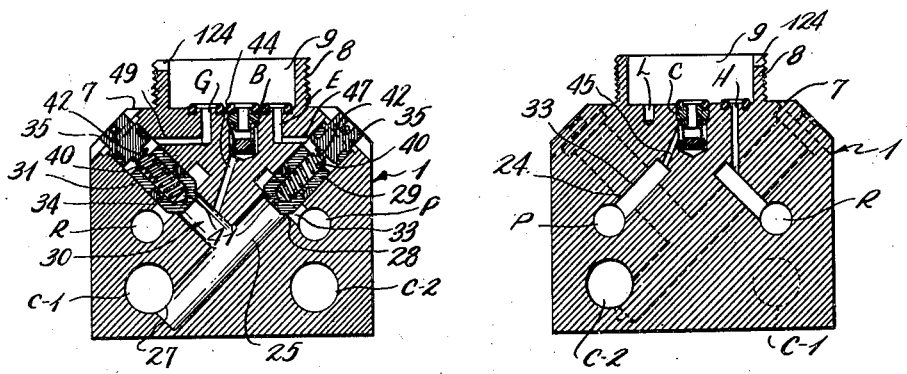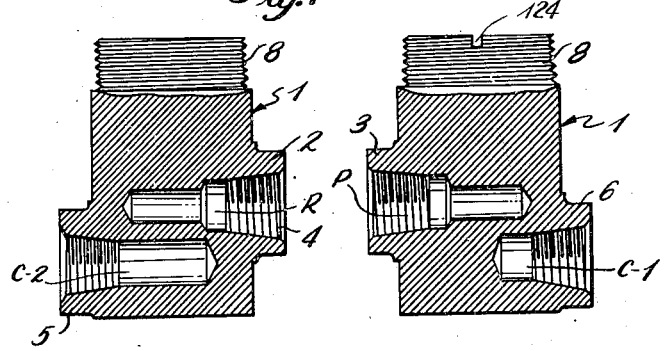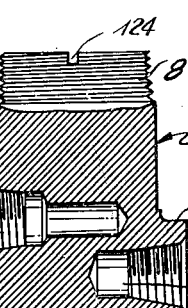
April 19, 1949.  O. C. MARTIN  2,467,533
PILOT VALVE STRUCTURE
Original Filed Sept. 17, 1945  5 Sheets-Sheet 2
INVENTOR.
OTIS C. MARTIN
deceased
BY MARION E. MARTIN
Administratrix
Harold W. Mattingly
Attorney April 19, 1949.    O. C. MARTIN    2,467,533
PILOT VALVE STRUCTURE Original Filed Sept. 17, 1945    5 Sheets-Sheet 3

INVENTOR.
OTIS C. MARTIN
            deceased
BY  MARION E. MARTIN
            Administratrix
    Harold W. Mattingly
            Attorney.

INVENTOR.
OTIS C. MARTIN deceased
BY MARION E. MARTIN
Administratrix
Harold W. Mattingly
Attorney April 19, 1949. O. C. MARTIN 2,467,533
PILOT VALVE STRUCTURE
Original Filed Sept. 17, 1945

INVENTOR.
OTIS C. MARTIN
deceased
BY MARION E. MARTIN
Administratrix
Harold W. Mattingly
Attorney Patented Apr. 19, 1949

2,467,533

UNITED STATES PATENT OFFICE 2,467,533

PILOT VALVE STRUCTURE

Otis C. Martin, deceased, late of Los Angeles, Calif., by Marion E. Martin, administratrix, San Gabriel, Calif., assignor to Harry Nock, Elizabeth, N. J.

Original application September 17, 1945, Serial No. 616,672. Divided and this application October 17, 1947, Serial No. 780,538

12 Claims. (Cl. 277—20)

1

This invention relates to pilot valve structures and has particular reference to a pilot valve assembly for actuating hydraulic or pneumatic valves controlling fluid actuated power systems.

This application is a division of the copending application filed by Otis C. Martin, Serial No. 616,672, filed September 17, 1945 and entitled "Fluid control valve."

In fluid systems it is the common practice to employ flow control valves for controlling the flow of fluid from a source of fluid under pressure to various pieces of apparatus to be actuated by such fluid. In many instances the space which is permitted in a particular location for the mounting of the fluid control valves is extremely limited, necessitating the use of a valve of minimum overall dimensions. However, when such valves are required to control either fluid under relatively high pressures or to control the flow of fluid in lines requiring a great fluid flow capacity, difficulty has been encountered in providing a valve of sufficiently small dimensions to fit within the space permitted for the same.

In many other instances the weight requirement becomes a major factor. For example, on airplanes it has recently become the common practice to utilize hydraulic fluid as a power transmission fluid for the operation of many of the functions of the airplane, such as ailerons, elevators, rudders, landing gear and the like. It is fundamental that each ounce of weight required to be carried on the airplane for the operation of the functional portions of the airplane detracts from the load carrying capacity of the plane and great effort has been expended in devising hydraulic equipment which will have a minimum of weight and yet have a hydraulic power capacity sufficient to operate the necessary equipment. One expedient which has been attempted to minimize the weight requirements of the operating equipment, valves and pipe lines has been to resort to power sources of relatively high pressure ranging up to 5000 or more pounds per square inch but heretofore all of the valve structures which have been employed for the control of such fluids under such high pressures have been excessive either as to bulk or weight, or both.

When such high pressures are used, considerable difficulty is encountered in constructing valves which can be readily and easily actuated to control the fluid at such pressures, it being infeasible to directly operate the control valves because of the excessive handle loads, making it necessary to employ pilot valves to apply fluid

2 from the pressure source as an actuating means for operating or actuating the main control valves.

In my copending application hereinbefore referred to, I have disclosed a valve structure which is extremely small and of extremely light weight, particularly adapted for installations in which weight and bulk must be maintained at a minimum. Such valve includes main control valves for controlling the hydraulic fluid in the power system, together with a pilot valve assembly which utilizes the high pressure fluid as a motive means for actuating the main control valves.

The construction of pilot valves for controlling such high pressure fluids and yet maintain the bulk and weight requirements at a minimum presents considerable difficulties and it is therefore an object of my invention to provide a pilot valve structure which may be readily constructed as a small compact unit which may be readily assembled with a main valve structure for controlling the main valves.

Another object of this invention is to provide a pilot valve structure of the character set forth wherein the valve assembly includes a plurality of disks stacked one upon the other with fluid passages formed by bores extending through certain of the disks communicating with grooves formed on the faces of the disks to direct the actuating fluid into the proper channels for actuating the main valve structures.

Another object of this invention is to provide a pilot valve structure of the character set forth wherein the movable pilot valve members are minute balls operating in shallow bores formed in certain of the pilot valve disks.

Another object of this invention is to provide a pilot valve structure of the character set forth wherein the assembled disks are secured together as a unit assembly for use on the main valve structure whereby maintenance of the main valve structure may be readily accomplished by the mere removal and replacement of the pilot valve unit.

Another object of this invention is to provide a pilot valve structure of the character set forth wherein one of the outside elements of the pilot valve unit is formed as a cup for receiving the disks required to make up the assembly and in which the side walls of the cup-shaped element constitute a housing for the remaining parts of the pilot valve assembly.

Another object of this invention is to provide a pilot valve structure of the character set forth wherein the cup-shaped housing element is formed with a plurality of fluid passage bores adapted to be aligned with fluid passage bores in the main valve structure whereby pilot valves of different assemblies for different main valve operations may be manufactured and stacked for interchangeable use in the main valve structures to adapt the main valve structures for different conditions of operation.

Other objects and advantages of this invention will be apparent from a study of the following specifications, read in connection with the accompanying drawings, wherein Fig. 1 is a front elevational view of a valve structure with which the pilot valve of this invention may be used;

Fig. 5 is a top plan view of the valve shown in Fig. 1 with the magnetic operating mechanism and pilot valve unit removed therefrom;

Fig. 6 is a transverse sectional view taken along line VI—VI of Fig. 5;

Fig. 7 is a transverse sectional view taken along line VII—VII of Fig. 5;

Fig. 8 is a transverse sectional view taken along line VIII—VIII of Fig. 5;

Fig. 9 is a vertical sectional view taken along line IX—IX of Fig. 5 during an intermediate step in the construction of the valve body shown in Fig. 5;

Fig. 10 is a vertical sectional view taken along line X—X of Fig. 5, also during an intermediate step in the construction of the valve shown in Fig. 5;

Figure 1:
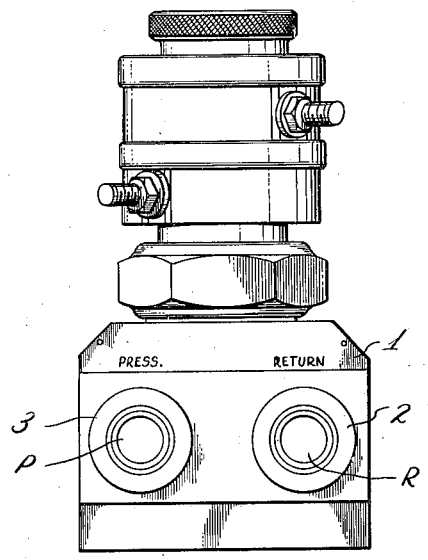
Figure 2:
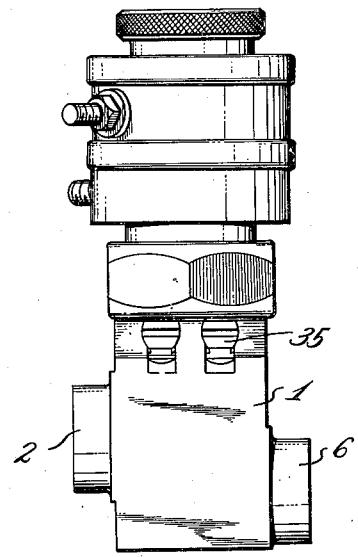
Fig. 2 is a side elevational view of the valve shown in Fig. 1.
Figure 3:
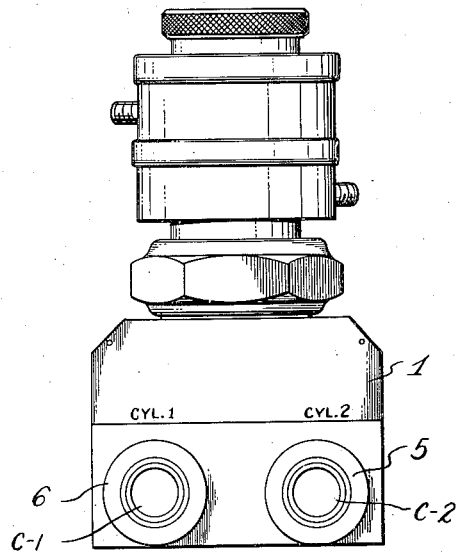
Fig. 3 is a rear elevational view of the valve shown in Fig. 1.

To facilitate a more ready understanding of the pilot valve structure of this invention, the following description illustrates the manner in which the pilot valve structure may be adapted for use on a 4-way main valve assembly though it will be understood by those skilled in this art that the principles of this invention are applicable to any type of main valve structure in which the power fluid is employed to actuate the main valve members to their various control positions, keeping in mind that all that is required is to provide upon the main valve structure a suitable space for mounting the pilot valve unit and ports in the body of the main valve structure leading from the main valve bores to a series of ports alignable with the several ports in the pilot valve assembly.

In the following description a typical valve structure such as that described and claimed in the copending application above referred to is used to illustrate the principles of this invention.

Typical main valve structure

Referring to the drawings, there is illustrated a typical main valve structure with which the pilot valve assembly of this invention may be used as comprising a valve body 1 which may be formed as a single block of suitable metal, preferably one of the light weight metals, to minimize the weight of the valve assemblies.

The particular form of valve illustrated is a typical 4-way valve adapted to control the flow of fluid to and from a double acting piston and cylinder mechanism in which it is desired to provide a neutral position in which no flow of fluid will occur, one operating position in which flow of fluid from a source of pressure will be admitted to the cylinder at one side of the piston, while fluid from the cylinder at the opposite side of the piston is passed through the valve to a return or exhaust line and a second operating position in which the flow of fluid is reversed, that is, fluid is permitted to flow from the source of pressure to the cylinder on the second mentioned side of the piston while fluid from the first mentioned side of the piston will be returned through the valve to a return or exhaust line. However, as pointed out above and as will be apparent from the following description, the principles of this invention are equally adapted to other specific valve applications and the pilot valve structure is not therefore to be limited to a 4-way valve operation.

The valve shown in Figs. 1 through 4 has a pair of outstanding bosses 2 and 3 formed on the body block 1. Through the boss 2 extends a horizontal bore R which may be threaded adjacent its outer end as indicated at 4 for the connection thereto of a threaded pipe fitting by which the valve is connected to the return line in the fluid system with which it is associated. Similarly, the boss 3 is provided with a port P adapted to be connected to a source of pressure in the fluid system.

The rear face of the body block 1 is illustrated as having projecting therefrom a pair of bosses 5 and 6 provided, respectively, with horizontally extending bores C—1 and C—2, respectively adapted to be connected to pipe lines leading, respectively, to the first end of an operating cylinder and piston mechanism and to the other end of such cylinder and piston mechanism.

By referring particularly to Figs. 5 through 8, it will be observed that the top face 7 of the body block 1 is provided with an upstanding boss 8 counterbored as indicated at 9 (see Fig. 6) to form a receptacle into which is inserted a pilot valve assembly to be hereinafter more fully described.

*Porting of valve bores to pilot valve receptacle*

The body block 1 is provided with a plurality of main valve bores, in each of which is located a main valve movable member adapted to seat upon a seat formed in the respective bores for controlling the flow of fluid between the pressure source, the piston and cylinder mechanism and the return or exhaust line. In order to adapt the movable valve members for actuation and control by the pilot valve assembly of this invention, it is necessary to provide control ports leading from the pilot valve receptacle or mounting to the main valve bores and the ports are required to be arranged in the pilot valve receptacle or mounting in a predetermined order to correspond with the ports formed on the pilot valve assembly so that the mere insertion of the pilot valve into the receptacle will align and connect up the proper receptacle ports and pilot valve ports.

As typical of the type of porting which is required, Figs. 5 through 8 illustrate a valve chamber bore 10 extending angularly into the block 1 from the upper right-hand corner of the body block as viewed in Fig. 6 to intersect the cylinder port C—2 at 11. The valve bore 10 is formed with a large diameter portion 12 adjacent the upper end of the block 1 and with a reduced diameter portion 13 adjacent its intersection with the cylinder port C—2.

It will also be observed that another valve chamber bore 14 extends in the same vertical plane as the bore 10 but from the upper left-hand corner of the body block 1 to intersect the bore 10 at 15. The bore 14, like the bore 10, includes an upper portion 16 of a larger diameter than the diameter of the lower portion 17 thereof.

The junctions between the larger and smaller diameter portions of the valve bores 10 and 14 comprise seats as indicated at 18 and 19, respectively, in the valve bores 10 and 14, against which seats and seals movable valve members 20 and 21 in the bores 10 and 14, respectively.

The movable valve members 20 and 21 are identical in construction and comprise a cylindrical block of metal, the lower end of which is beveled as shown in Fig. 6 to form a beveled seating surface adapted to seat and seal upon the valve seats 18 and 19, there being an annular groove 22 formed about the cylindrical surface of the movable valve members, within which is located an O-ring or donut seal 23 to prevent leakage of fluid between the movable valve member 20 and the upper portion 12 of the bore 10 within which the valve member 20 is adapted to move and without imposing undue resistance to the free movement of the valve member 20 toward and away from its seat 18. The valve member 21 and, in fact, as will be apparent from an inspection of Figs. 6 and 7, all of the main movable valve members, are identical in construction, each being provided with the groove and sealing ring corresponding to the groove 22 and sealing ring 23.

Referring particularly to Fig. 6, it will be observed that immediately above the valve seat 19 there is a circumferential enlargement 24 of the bore 14 sufficient to intersect pressure port P so that when the movable valve member 21 is lifted from its seat 19 the fluid passage is provided intercommunicating the pressure port P with the cylinder port C—2, permitting fluid to flow from the source of pressure to that side of the operating cylinder with which the port C—2 is connected.

By referring particularly to Fig. 7, it will be observed that a valve chamber bore 25 extends from the upper right-hand corner of the body block 1, as viewed in Fig. 7 (the corner adjacent the cylinder port C—2 as viewed in Fig. 5), the bore 25 extending through the body block 1 at such angle that it intersects the cylinder port C—1 at 27. The valve chamber bore 25, by virtue of its being formed of two different diameters, provides a valve seat 28 against which a main valve member 29 is adapted to seat. A fourth valve chamber bore 30 extends from the opposite upper corner of the body block 1 to intersect the bore 25 in which is located the fourth movable valve member 31.

While the particular angles at which the valve chamber bores 10, 14, 25 and 30 extend are not critical, I find that a block 1 can be maintained at a minimum bulk by extending the valve chamber bores at approximately 45° relative to the base or bottom of the block and it will be noted that each of the valve chamber bores, being straight circular cross section bores, may be readily formed either by a turning operation on a lathe or by a drilling operation, thus simplifying the machining operations necessary to form the valve chamber bores and the porting necessary to intercommunicate the valve chamber bores with the pressure port and return port. A simple machining operation performed either upon a lathe or drill press may be employed to provide the circumferential enlargements of the valve chamber bores necessary to intercommunicate them with the cylinder bores C—1 and C—2, respectively.

The valve bore 10 intercommunicates with the pressure port R by way of the enlargement 32, the valve chamber bore 25 intercommunicating with the pressure port P by way of the enlargement 33, and the valve chamber bore 30 intercommunicating with the return port R by way of an enlargement 34. Thus all of the machining operations which are required to be performed on the body block 1 comprise either drilling operations or turning operations necessary to provide the pressure port P, the return port R, the cylinder ports C—1 and C—2 and the various valve chamber bores described.

At this point it should be noted that the assembly of the various main movable valve members 20, 21, 29 and 31 may be readily accomplished by inserting the valve members into their respective valve chamber bores where they are retained by means of plug members 35, each of which preferably comprises a cylindrical plug insertable into the enlarged portion of the valve chamber bore and having an O-ring seal 36 extending about the same to form a fluid tight seal with the adjacent walls of the valve chamber bore. The plug 35 is provided with a radially extending flange 37, a portion of which on opposite sides of the plug is cut away as indicated at 38 to permit its insertion into a milled square opening formed in the milled rectangular slot formed in the body block at the outer end of the valve chamber bore, the sides of the slot being under-cut as indicated at 39 to receive the flange 38 when a 90° turn is given to the plug 35 after its insertion into the valve chamber bore.

In the form of valve illustrated in Figs. 1 through 8, the main movable valve members are all adapted to be normally seated or "closed" in the neutral position of the valve and I prefer to urge each of these valves toward its seated relation by means of a compression spring 40 which may comprise a short length of helical spring, one end of which is received within a counterbore 41 extending from the upper end of the movable valve member, the opposite end of the spring 40 being preferably engaged about a protruding boss 42 formed upon the under side of the plug 35.

Since the main movable valve members are adapted to be actuated as a result of a pilot valve operation, I intercommunicate the various main valve chambers with the pilot valve socket 9 by means of suitable ports.

By referring particularly to Fig. 5, it will be observed that the bottom of the pilot valve socket 9 is formed with a plurality of vertically extending port bores A, B, C, D, E, F, G and H. The port A communicates with the cylinder port C—2 by way of a small bore 43, which intersects the valve chamber bore 10. The port B is in constant communication with the cylinder port C—1 by way of a small bore 44 which intersects the valve chamber bore 30 below the movable valve member 31.

The port C is in constant communication with the pressure port P by way of a small bore 45 (see Fig. 8) which intercommunicates with the intersecting enlargements 24 and 33 of the valve chamber bores 14 and 25, respectively, the point of communication being thus above the valve seats 18 and 28 of these valve chamber bores.

The port H is in constant communication with the cylinder port C—1, the port H communicating with the intersecting enlargements 32 and 35 of the valve chamber bores 10 and 30, respectively. Again the point of communication between the port H and the valve bores 10 and 30 is made above the valve seats in these valve chamber bores 10 and 30.

The port D is in constant communication with the valve chamber bore 10 by way of a small port 46 at a point above the main movable valve 12 in that bore; port E is constantly in communication with the valve chamber bore 25 by way of a small port 47 at a point above the main valve member 29 therein; the port F is in constant communication with the valve chamber bore 14 by way of a small port 48 at a point above the main valve member 21 therein; and the port G is in constant communication with the valve chamber bore 30 by way of a small port 49 at a point above the main valve 31 therein.

Since all of the ports A, B, C, D, E, F, G and H are vertical bores, they may be readily drilled into the body block 1 by either a simple drill press or lathe operation. The interconnecting ports or bores 43, 44, 45, 46, 47, 48 and 49 are likewise straight drilled bores which may be readily machined as shown in the drawings by a simple drilling operation.

Pilot valve

With the structure thus far described it will be apparent that when the valve is in its neutral or off position all that is necessary is to supply pressure from the fluid source above each of the main valve members, the effect of such pressure being to force the main valve members tightly upon their respective seats and to prevent the flow of any fluid through the system. To accomplish this, it is necessary therefore that pressure from the fluid source be supplied through the pilot valve structure in such manner as to expose the source of pressure to the upper end of each of the main valve members.

It will also be apparent that when it is desired to move the piston in the cylinder mechanism in one direction, it is necessary to open one of the main valve members intercommunicating the source of pressure with one of the cylinder ports, for example, C—1, and simultaneously open one of the main valve members to allow fluid to flow from the other end of the cylinder through cylinder port C—2 and back to the return or exhaust line. Hence the pilot valve structure when operated to cause movement of the cylinder and piston mechanism in this one direction should exhaust fluid from the upper ends of the main valve members 20 and 29. During the operation it is necessary to maintain fluid pressure from the source above the main valve members 21 and 31. When the opposite operation of the piston and cylinder mechanism is desired, it is necessary for the pilot valve structure to exhaust the pressure fluid from above the main valve members 21 and 31 while holding pressure above the main valve members 20 and 29.

This result is readily accomplished by means of the pilot valve assembly illustrated particularly in Figs. 11 through 21, which comprises a pilot valve assembly unit 50 comprising a cup-like case 51 having a bottom wall V and cylindrical side walls 52. Within the case 51 is assembled one upon the other a plurality of disks which may be identified as W, X, Y and Z, respectively. In the pilot valve assembly the bottom wall V of the case 51 comprises the lowermost of the pilot valve elements and is adapted to be received in the pilot valve socket 9 in such fashion as to align a plurality of vertical bores extending therethrough with the respective ports A, B, C, D, E, F, G and H. These bores may be identified, respectively, by the reference characters Aa, Ba, Ca, Da, Ea, Fa, Ga and Ha, and so disposed about the bottom V as to be alignable, respectively, with the ports A, B, C, D, E, F, G and H when a locating pin 53 extending through a locating bore La in the case 51 is located in a locating bore L formed in the bottom of the pilot valve receiving socket 9.

Figure 16:
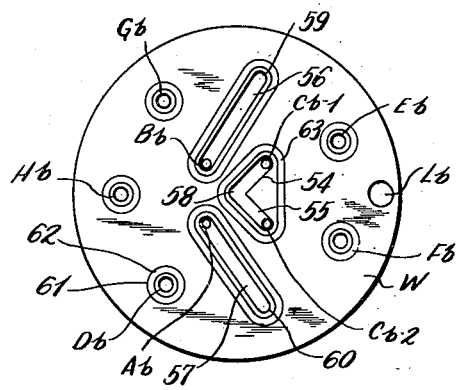
Fig. 16 is a bottom plan view of the lowermost disk of the valve assembly shown in Figs. 11 and 12.
Figure 17:
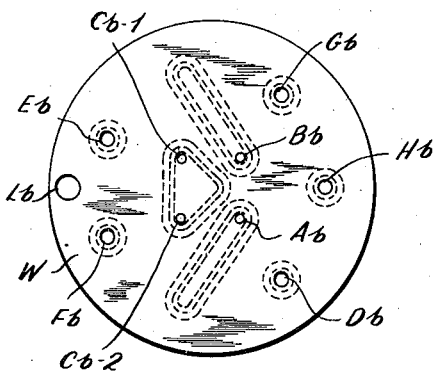
Fig. 17 is a top plan view of the disk shown in Fig. 16.

The next uppermost plate or disk W in the valve assembly is illustrated in Figs. 16 and 17 as having formed therethrough a plurality of ports Eb, Gb, Hb, Db and Fb, respectively alignable with the bores Ea, Ga, Ha, Da and Fa in the bottom V of the case. In addition thereto, the under surface of the disk W is formed with elongated depressions 54, 55, 56 and 57. The depressions 54 and 55 extend at such angle to each other as to intersect at 58 immediately above the central port Ca through the bottom V of the case. The depression 56 extends across the under surface of the disk W at such angle as to have one of its ends 59 immediately above the bore Ba in the bottom V while the opposite of its ends communicates with an auxiliary bore Bb which extends through the plate W. The depression 57 similarly extends from a point 60 above the port A to an auxiliary bore Ab which extends upwardly through the plate W.

At this point it should be noted that surrounding each of the bores Eb, Gb, Hb, Db and Fb is an annular depression 61, within which is located a seal 62 adapted to make sealing contact with the upper surface of the bottom V of the case 51, to effectively seal the aligned bores against the escape of fluid between the bottom V and the disk W. Similarly, the elongated depressions 54—57 are each surrounded by encircling depressions containing seals such as indicated at 63.

Figures 12, 13:
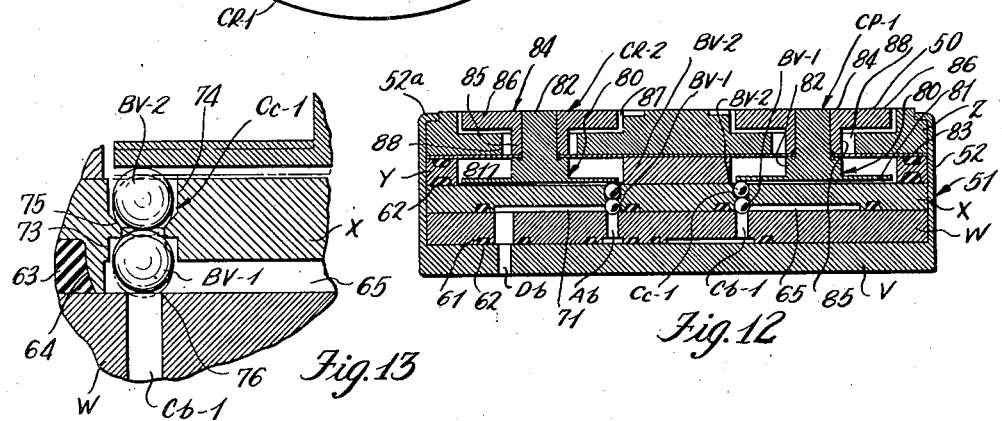
Fig. 12 is a vertical sectional view taken along line XII—XII of Fig. 11.
Fig. 13 is a fragmentary enlarged vertical sectional view of a portion of the pilot valve assembly shown in Figs. 11 and 12.
Figure 14:
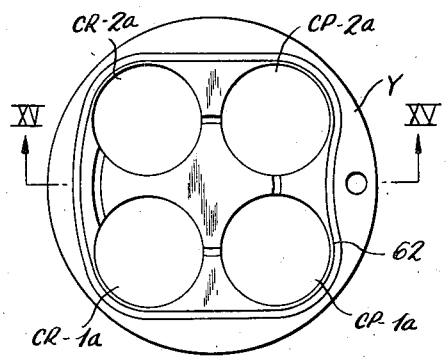
Fig. 14 is a top plan view of the next to top disk employed in the assembly of the pilot valve structure shown in Figs. 11 and 12.
Figure 15:
Fig. 15 is a vertical sectional view taken along line XV—XV of Fig. 14.

By referring particularly to Figs. 12 and 13, it will be observed that the seals 62 and 63 may be formed of suitable sealing material such as synthetic rubber molded directly into the seal-receiving depressions in the disk W, the depressions having side walls flaring outwardly adjacent the surface of the disk as indicated particularly at 64 in Fig. 13. By merely coating the disk with a coat of sealing material, the disk may be pressed by suitable pressure against any suitable flat surface and while so pressed heat applied to the disk will cure the sealing material in place therein, the excess sealing material over the surface of the disk other than at the depressions being squeezed out, leaving the depressions filled with the sealing material. When such seals are exposed to the fluid in the system, there appears to be a tendency for the adherence between the seal 62 and the wall 64 of the depression to separate, the sealing material bulging out under the effect of the fluid pressure to tightly engage the adjacent surface of the next element in the pilot valve disk assembly and prevent the passage of fluid between the meeting surfaces of the disk assemblies. However, until exposed to the fluid pressure, the natural adherence of the sealing material will be sufficient to hold the seals in place within the depressions, thus facilitating the assembly of the various elements of the pilot valve without fear of loss of the seals.

Figure 18:
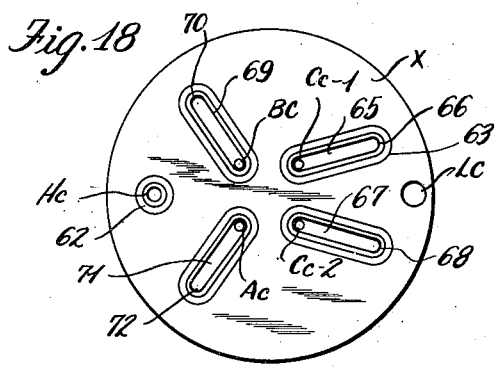
Fig. 18 is a bottom plan view of the next lowermost disk in the pilot valve assembly shown in Figs. 11 and 12.
Figure 19:
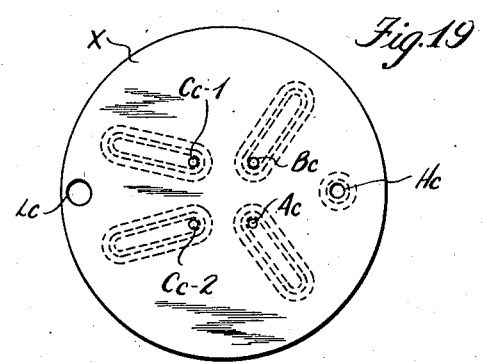
Fig. 19 is a top plan view of the disk shown in Fig. 18.
Figure 21:
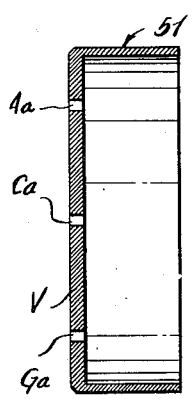
Fig. 21 is a sectional view of the housing shown in Fig. 20 taken along line XXI—XXI of Fig. 20.
Figure 20:
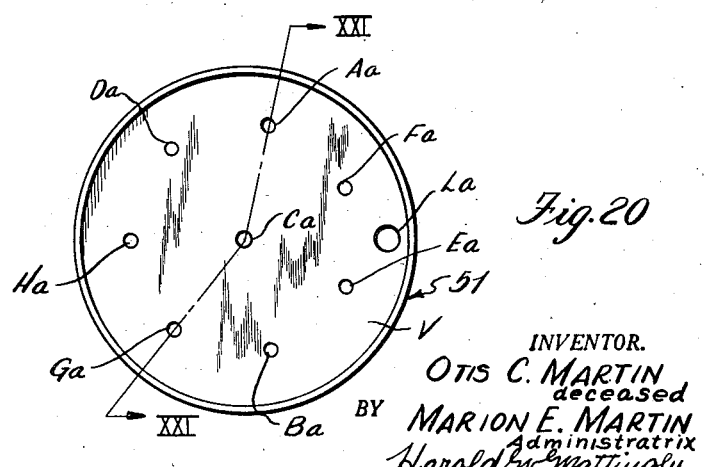
Fig. 20 is a top plan view of one of the outermost elements comprising a cup-like housing forming a part of the valve assembly shown in Figs. 11 and 12.

The next uppermost disk X is illustrated particularly in Figs. 18 and 19 as having a locating bore Lc adapted to receive the locating pin 53 and thus align auxiliary bores Cc—1 and Cc—2 with the bores Cb—1 and Cb—2 in the disk W upon which the disk X rests. Similarly, bores Bc and Ac will be aligned with the bores Bb and Ab, respectively, in the disk W. A bore Hc will likewise be aligned with the bore Hb extending through the disk W. The bore Hc is surrounded by a seal 62 similar to the seals described with reference to the disk W while the under surface of the disk X is provided with elongated depressions, one of which indicated at 65 extends from the bore Cc—1 into alignment with the bore Eb, shown at 66, through the disk W; another of which indicated at 67 extends from the bore Cc—2 into alignment at 68 with the bore Fb in the plate W; another of which indicated at 69 extends from alignment with the bore Bc to a point 70 alignable with the bore Gb in the plate W; while the final one indicated at 71 extends from alignment with the bore Ac to a point 72 alignable with the bore Bb in the plate W. Each of the elongated depressions is surrounded by a suitable seal 63 corresponding to the seals 63 described with reference to the disk W.

In the form of pilot valve structure illustrated in Figs. 11 through 20, it will be noted that the bores Cb—1 and Ab through the disk W are of a diameter less than the diameter of a ball valve BV—1 and it will be further noted that the bore Cc—1 is formed upon three diameters (see Fig. 13), the lowermost portion 73 of which is formed upon a diameter greater than the ball valve BV—1, the upper portion 74 being formed upon a diameter in excess of the diameter of a second ball valve BV—2, while the intermediate portion 75 is formed on a diameter smaller than the diameter of either of the ball valves BV—1 and BV—2.

Thus when the ball valves BV—1 and BV—2 are in their uppermost or full line positions, as shown in Fig. 13, the ball valve BV—1 will rest against a seat formed by the junction of the smaller and larger diameter portions 75 and 73 of the bore Cc—1 while at the same time the ball valve BV—1 will be spaced away from the seat 76 at the upper end of the bore CB—1. The thickness of the disk X is somewhat less than twice the diameter of the ball valves BV—1 and BV—2 and the depth of the bore portions 73 and 74 is such that when the ball valves BV—1 and BV—2 are assembled as indicated in Figs. 12 and 13 the balls will rest one upon the other. Thus fluid pressure entering upwardly through the bore Cb—1 will force the ball valve BV—1 upwardly into seating relation with its uppermost seat and at the same time will press the ball valve BV—2 upwardly away from its seat formed at the junction of the portions 74 and 75 of the bore Cc—1.

Similarly, ball valve assemblies located in the disk X of the bores Cc—2, Ac and Bc will be held in their elevated or neutral positions by fluid pressure exerted upwardly through these respective bores.

It will be recalled that the port C through the bottom of the pilot valve receiving socket 9 is permanently connected by the small bore 45 to the incoming pressure from the pressure port P and hence pressure from the source will be supplied through the port C and through the aligned port Ca in the bottom V of the pilot valve case 51. Thence the pressure will be distributed through the grooves 54 and 55, respectively, to the ports Cb—1 and Cb—2 in the lowermost disk W of the pilot valve assembly.

The incoming pressure will therefore impinge upon the lowermost ball valves BV—1 in each of the ports Cb—1 and Cb—2, holding these ball valves upwardly against their respective seats 75, and away from their respective seats 76. Thus the fluid pressure entering through the port Cb—1 will be distributed through the grooves 66 and 67, respectively, which, it will be recalled, overlap the ports Eb and Fb, respectively, and through which the pressure fluid will pass downwardly through these latter ports in the disk W and through the ports E and F to supply fluid pressure above the valve members 21 and 29, respectively.

At the same time it will be observed that the ports D and G communicating respectively with the upper ends of the other main valves 20 and 31 allow any back pressure from the cylinder ports C—1 and C—2 to be exerted above the valves 20 and 31, respectively.

It will be recalled that the port A is aligned with the port Aa in the bottom V of the pilot valve case 51 which will be aligned with the end 60 of the groove 57 in the lower surface of the lower plate W and that the opposite end of this groove is aligned with the port Ab in the lower disk W so that any back pressure existing in the port C—2 such as would be occasioned by a tendency of the piston of the power cylinder attempting to creep in one direction will impinge upon the ball valve BV—1 located in the port Ab and will cause this ball valve BV—1 to rise from its seat, permitting the fluid from the cylinder port C—2 to flow through the groove 71 in the plate X, the end 72 of the groove 71 being aligned with the port D in the pilot valve socket which communicates through the small bore 46 to the upper surface of the main valve member 20. Thus this valve 20 would be held closed against the leakage of fluid from the cylinder back to the return port R.

At the same time the port B is exposed to the back pressure from the cylinder which may pass through cylinder port C—1 and any tendency for the main power cylinder to creep in the direction controlled through the port C—1 will cause such back pressure to be exerted through the port B, the port Ba in the lower wall V of the pilot valve casing 51 through the groove 56 in the lower plate W of the pilot valve assembly to the port Bb therein, thus exerting a pressure on the ball valve BV—1 which is in the port Bb to hold the ball valve from its seat and permitting such back pressure to pass through the groove 69 in the disk X and thence by way of the end 70 of that groove and back down through the port Gb in the disk W and the port G to exert such back pressure upon the upper side of the main valve 31, thus preventing the escape of any fluid from the cylinder through the cylinder port C—1 back to the return port R.

At this point attention is called to the fact that the piston in the power cylinder is positively held in that position to which it has been moved by any previous functioning of my valve and the load supported by the piston in any such position will cause a back pressure to be exerted upon the valves controlling the connection of the power cylinder to the return or exhaust port in such fashion as to prevent inadvertent escape of the fluid from the main power cylinder and to positively hold the power cylinder in such position.

Assuming that it is desired to move the main power piston in one direction, all that is necessary is to so operate the pilot valve assembly as to discharge the pressure fluid from the pressure source from above one of the main valves such as 21 or 29 and at the same time relieve the back pressure from above the opposite main valves 20 and 31.

Assuming that it is desired to operate the main power piston in the direction in which it should move were pressure from the pressure supply line supplied through the cylinder port C—1, this result may be accomplished by the operation of the ball valves in the ports Cb—1 and Ab, as viewed in Fig. 12.

Figure 11:
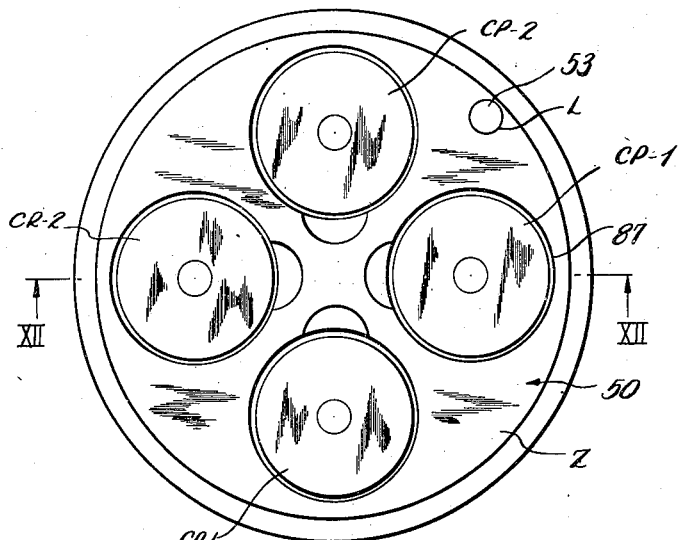
Fig. 11 is a top plan view of the pilot valve assembly constructed in accordance with this invention and adapted to be employed in the operation of a valve of the type shown in Figs. 1 through 4.

By referring particularly to Figs. 11, 12 and 13, it will be observed that in the pilot valve assembly the disk Y which is disposed immediately above the disk X is provided with four openings CP—1a, CP—2a, CR—1a and CR—2a distributed symmetrically about the center of the disk Y and into each of which projects an operating button CP—1, CP—2, CR—1 and CR—2, respectively, each of the buttons overlying one of the ball valve assemblies BV—1 and BV—2 disposed in the ports Cb—2, Cb—1, Bb and Ab, respectively. Each of the buttons is constructed, as shown particularly in Fig. 12, of a lower button member 80 which comprises a disk-like head 81 having a stem 82 which extends upwardly through a thin large diameter disk 83 while the upper button member 84 comprises a hollow stem 85 adapted to be telescopically received upon the stem 82 and is also provided with a radially extending disk-like flange 86.

The uppermost disk Z of the pilot valve assembly, as viewed in Fig. 11, includes a relatively large diameter bore 87 for each of the buttons CP—1, CP—2, etc., into which the upper flanges 86 of these buttons are received, the disk Z being provided with a counter bore 88 for each of the buttons through which the telescoped stems of the button assemblies may pass.

By referring particularly to Fig. 12, it will be observed that the large diameter disk 83 is relatively thin and is preferably formed of resilient material to which each of the buttons is attached by disposing the disk 83 between the telescoped stems of the buttons. Thus the inherent resilience of the material of the disk 83 will cause all of the buttons to be disposed in the positions shown in Fig. 12 with the lower flange 81 of each of the buttons barely resting upon the uppermost ball valves BV—2 of each of the ball valve assemblies. However, upon depressing the buttons CP—1, CP—2, etc., the lower flanges 81 of each of these buttons so depressed will depress the ball valve assemblies BV—1 and BV—2.

In assembling the pilot valve disks, the disk Y will be placed upon the disk X where it will make sealing contact by reason of a strip of sealing material 62 (similar to the strips of sealing material 62 described with reference to the disk W) which extends about the under surface of the disk Y. A similar strip of sealing material 62 extends about the upper surface of the disk Y and seals the upper surface of the disk against the resilient disk 83. The entire pilot valve assembly as described herein is then sealed together by means of rolling over the upper edge of the side wall 52 of the pilot valve case 51 as indicated at 52a in Fig. 12.

Assuming that pressure from the pressure source is to be supplied from one end of the power cylinder through the cylinder bore C—1, the button CP—1 should be depressed at the same time that button CR—2 is depressed to operate the ball valve assembly disposed immediately beneath these buttons.

The depression of the button CP—1 will move the ball valve assembly associated therewith downwardly to cause the ball valve BV—1 to close off against its seat 76 and prevent the passage of pressure fluid from the pressure source to the upper end of the piston 29, as previously traced. At the same time the depression of the ball valve BV—1 will open a fluid passage through the groove 65 and the port Cc—1 to permit the fluid which has been disposed above the piston 29 to escape to the return port R above the valve BV—1 and through the port Cc—1 to the space above the disk X.

By referring particularly to Figs. 5, 8 and 14 through 20, it will be observed that the port H which communicates with the return port R also communicates through the pilot valve assembly with the upper surface of the pilot valve disk X through aligned ports, Ha, Hb and Hc in the bottom V of the pilot valve casing 51, the disk W and the disk X, respectively. Thus the fluid which passes the ball valve BV—1 may flow to the return port about the ball valve BV—2 and the main valve 29 will be forced from its seat 28 by the effect of the pressure fluid entering through the pressure port P.

With the main valve 29 lifted from its seat, pressure from the fluid source is supplied through the pressure port P of the valve chamber bore 25 to the port C—1 and thence to one end of the power cylinder to cause the piston therein to move in one direction.

At the same time the button CP—1 was depressed, the button CR—2 was also depressed, causing the ball valve assembly BV—1 and BV—2 disposed beneath the button CR—2 to be moved from its normal operative position and in so doing the ball valve BV—1 associated therewith will be closed against its lower seat. The back pressure from the cylinder port C—2 is therefore prevented from exerting further pressure through the port D upon the upper end of the main valve 20 and any pressure which had previously been exerted upon the upper end of the valve 20 is permitted to exhaust past the ball valve BV—2 to the space above the disk X and thence to the return line through the aligned ports H, Ha, Hb and Hc as hereinbefore described. Thus the valve 20 is forced upwardly from its seat 18 by the force of the fluid exhausting from the end of the cylinder opposite to that which is now connected to the pressure supply.

Thus the piston will be moved under the influence of the pressure from the fluid source as long as the buttons CP—1 and CR—2 are held depressed.

Upon release of the buttons CP—1 and CR—2 all of the parts will be restored to their normal positions and further movement of the piston in the power cylinder will be arrested, the back pressure exerted in the power cylinder by any effort of the piston to move either forwardly or backwardly thereof being transmitted back to the main valves to hold these valves in closed position and prevent creepage of the power piston in either direction.

Similarly, if it is desired to move the power piston in the opposite direction, the simultaneous depression of the buttons CP—2 and CR—1 will cause the main valves 21 and 31 to open, permitting pressure from the pressure source to pass from the pressure port P to the cylinder port C—2 while the exhaust fluid from the cylinder will pass from the cylinder port C—1 to the return port R and the piston will be moved in the new direction until the buttons CP—2 and CR—1 are released.

*Diagram of fluid flow*

Figure 22:
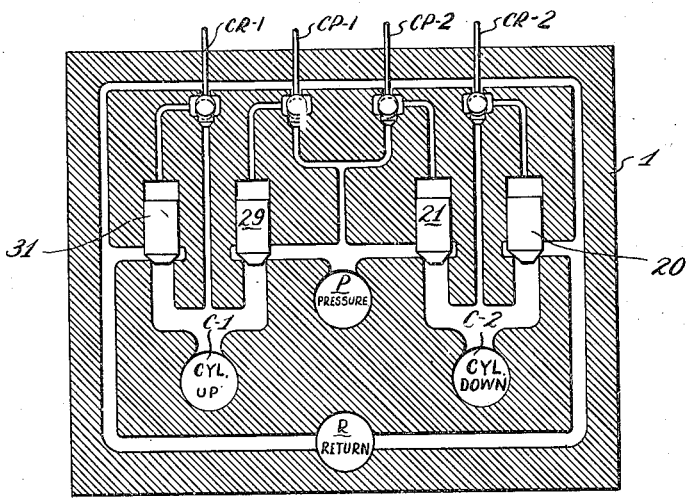
Fig. 22 is a diagrammatic view illustrating the assembly and operation of the pilot valve and main valve structure shown in Figs. 1 through 21.

In Fig. 22 a simplified diagram is illustrated showing in diagrammatic form the fluid flow through the valve for the operation of a power piston as hereinbefore described and which permits the more ready tracing of the operation of the valve assembly.

Figure 4:
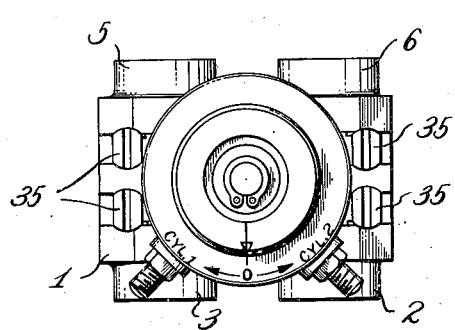
Fig. 4 is a top plan view of the valve shown in Fig. 1.

In Fig. 4 the valve body is illustrated at 1 as having a pressure port P, a return port R, a cylinder port C—1 (bearing the legend "Cyl. up") and a cylinder port C—2 (bearing the legend "Cyl. down"). The main control valves 20, 21, 29 and 31 are illustrated as controlling the flow of fluid to and from the cylinder ports C—1 and C—2 and this in turn is being controlled by pilot valve assemblies adapted to be actuated by buttons CP—1, CR—1, CP—2 and CR—2, respectively.

Thus the depression of the button CP—1 permits pressure fluid from the pressure source to be exhausted from above the main valve 29 back to the return port R and allows the pressure from the pressure source P to lift the valve 29 from its seat and to pass the pressure fluid to the cylinder port C—1.

At the same time the depression of the button CR—2 will cause the back pressure from cylinder port C—2 to be exhausted from above the main valve 20 and will allow this valve to be raised from its seat by the back pressure created by the piston attempting to exhaust fluid from the end of the cylinder connected to cylinder port C—2.

The reverse operation may be accomplished by operating the button CP—2 to allow the piston 21 to be pressed from its seat by the pressure fluid and allow the pressure fluid to enter through the cylinder port C—2 while a simultaneous depression of the button CR—1 will permit the fluid exhausting from the opposite end of the cylinder to lift the main valve 31 from its seat and exhaust the fluid from that end of the cylinder to the return port R.

*Adaptation of valve assembly to special applications*

From the foregoing it will be apparent that there is provided a valve assembly in which the essential operating parts are a body member bored to provide a plurality of valve chambers in which are located main control valves and a pilot valve receiving socket, together with a unitary pilot valve assembly which may be constructed as a separate unit and assembled with the body merely by its insertion into the socket and into alignment therein by means of the locating pin 53.

The construction of the body block and its valve chamber bore, together with the various ports which interconnect the ports leading to the pilot valve socket, may be employed as a universal body block for various valve applications merely by the substitution of different pilot valve assemblies in the pilot valve receiving socket.

As described herein, the valve structure is adapted as a 4-way valve for the operation of a power piston in either of two directions and the valve is adapted to hold the piston in any position to which it has been moved without possibility of creeping of the piston while the valve is in its neutral position. The structure as described may be termed a "normally closed" valve in which in the neutral position all of the main valve members are closed.

Special applications may require a change in this type of operation of the main valves, it frequently being desirable to maintain pressure from the fluid source against the power piston when the valve is in its neutral position. Such operation may be readily accomplished merely by the substitution of a different pilot valve assembly.

Figure 23:
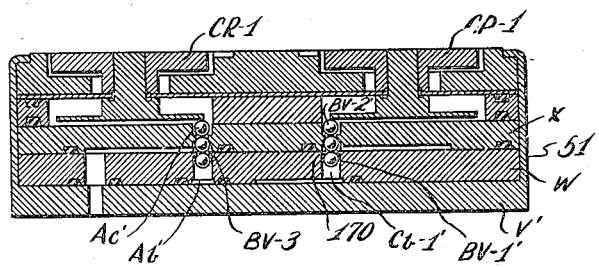
Fig. 23 is a vertical sectional view similar to Fig. 12 but illustrating a modified form of pilot valve structure which may be used to accomplish different operational controls on the main valve structures.
Figure 24:
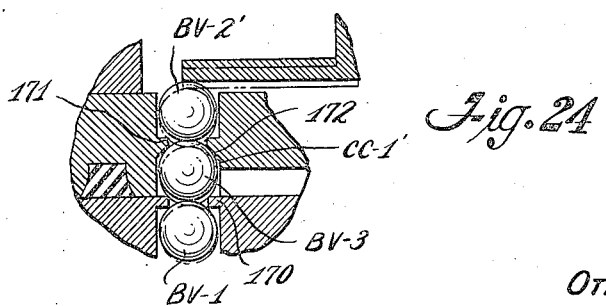
Fig. 24 is an enlarged fragmentary sectional view of the pilot valve assembly shown in Fig. 23.

As shown particularly in Figs. 23 and 24, a pilot valve assembly adapted for this latter purpose would include the pilot valve case 51' identical in all respects with the pilot valve case 51, the lower wall V of which will be provided with ports alignable with the ports in the pilot valve receiving socket 9. The lowermost plate W' of this pilot valve assembly would differ from the lower plate W hereinbefore described only by having the ports Ab' and Cb—1' formed on two diameters to provide a valve seat 170 against which a lower ball valve BV—1' is adapted to be seated under the influence of fluid pressure from the pressure source or back pressure in the power cylinder as distinguished from holding such valve members out of seating relation as was described with reference to Figs. 12 through 20.

The next uppermost disk X' of the pilot valve assembly is provided with ports Cc—1' and Ac' so constructed as to provide a seat 171 for the uppermost ball valve BV—2' and an auxiliary seat 172 for an intermediate ball valve BV—3.

Thus normally the valves in the ports of the pilot valve assembly which control the application of pressure from the fluid source to the upper sides of the main movable valves 20, 21, 29 and 31 will be closed against their seats 170, allowing fluid from above the main valve members to be exhausted past the valve seat 171 to the return port R in the manner described with reference to Figs. 13 through 20.

Upon depression of the pilot valve buttons CP—1 and CR—1 or CP—2 and CR—2, the main valves will be moved from their normal open positions to closed positions by reason of the lower ball valve member BV—1' being moved away from its seat 170 to permit pressure from the fluid source to be admitted above the main valves while at the same time escape of fluid from above the main valves is prevented by closing of the ball valve members BV—2' against its seat 171.

By providing pilot valve assemblies having various combinations of ball valve assemblies such as the ball valve assemblies illustrated in Fig. 26 controlling one of the main valves to hold such main valve in open position when the valve assembly has been operated to a "neutral" position while others of the ball valve assemblies are as illustrated in Fig. 13, substantially any combination of control may be readily accomplished.

The operation of the buttons CP—1, CP—2, CR—1 and CR—2 may be accomplished in any desired manner such as by a manual and/or magnetic operation as described in the copending application Serial No. 616,672 above referred to or by any other suitable mechanism by which the individual buttons may be actuated to cause the pilot valve structure to function to control the main valves in the desired manner.

It will therefore be observed that I have provided a pilot valve structure in which pilot valves for various types of operations may be manufactured in quantities and stacked ready for assembly on valve bodies to produce the desired functioning of the main valves and wherein maintenance and repair of the valves with which the pilot structures are associated may be readily accomplished by the mere removal of one pilot valve unit and the replacement of a new or repaired pilot valve unit.

Also it should be noted that the construction of the pilot valve utilizing the disk assembly permits the manufacture of the various disks on a mass production basis, requiring only the assembly of the appropriate disks to produce the desired pilot valve functions.

While there is shown and described the preferred embodiment of this invention, the same is not to be limited to any of the details of construction shown and described herein, except as defined in the appended claims.

It is claimed:

1. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, and fluid passage means intercommunicating said offset related bores comprising grooves in the faces of the disks extending from a position of alignment with a bore in one disk to a position of alignment with the offset bore in the next adjacent disk, certain of the bores in said disks defining valve seats and movable valve members disposed in said bores to seat upon said seats so defined.

2. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks extend from a position of alignment with a bore in one disk to a position of alignment with the offset bore in the next adjacent disk, certain of the bores in said disks defining valve seats, and ball valves in said bores disposed in said bores to seat upon the seats so defined, said ball valves having a diameter less than the thickness of the disk in which it is located.

3. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with a bore in one disk to a position of alignment with the offset bore in the next adjacent disk, and flexible seating means surrounding said bores and said grooves on at least one face of each disk to make a fluid-tight seal against the adjacent face of the adjacent disk.

4. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with a bore in one disk to a position of alignment with the offset bore in the next adjacent disk, and flexible seating means surrounding said bores and said grooves on at least one face of each disk to make a fluid-tight seal against the adjacent face of the adjacent disk, each of said sealing means comprising an endless strip of sealing material extending about the associated bore or groove.

5. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with a bore in one disk to a position of alignment with the offset bore in the next adjacent disk, and flexible seating means surrounding said bores and said grooves on at least one face of each disk to make a fluid-tight seal against the adjacent face of the adjacent disk, each of said sealing means comprising an endless groove in the face of the disk and individually surrounding each of said bores and grooves, respectively, and an endless strip of sealing material in each of said last-named grooves.

6. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with a bore in one disk to a position of alignment with the offset bore in the next adjacent disk, flexible seating means surrounding said bores and said grooves on at least one face of each disk to make a fluid-tight seal against the adjacent face of the adjacent disk, each of said sealing means comprising an endless groove in the face of the disk and individually surrounding each of said bores and grooves, respectively, each of said grooves having a cross-section wider at the face of the disk, and an endless strip of sealing material in each of said last-named grooves.

7. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with a bore in one disk to a position of alignment with the offset bore in the next adjacent disk, flexible seating means surrounding said bores and said grooves on at least one face of each disk to make a fluid-tight seal against the adjacent face of the adjacent disk, each of said sealing means comprising an endless groove in the face of the disk and individually surrounding each of said bores and grooves, respectively, each of said grooves having a cross-sectional shape including parallel side walls for a portion of the depth of the groove and a diverging side wall portion adjacent the face of the disk, and an endless strip of sealing material in each of the last-named grooves.

8. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with a bore in one disk to a position of alignment with the offset bore in the next adjacent disk, and means for holding said disks assembled as a unit comprising a case having a flat bottom and side walls having a contour corresponding with the contour of the periphery of the disks, and means for squeezing said assembled disks toward the bottom of the case.

9. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with a bore in one disk to a position of alignment with the offset bore in the next adjacent disk, means for holding said disks assembled as a unit comprising a case having a flat bottom and side walls having a contour corresponding with the contour of the periphery of the disks, means for squeezing said assembled disks toward the bottom of the case, and bores through the bottom of the case alignable with the bores through the disk disposed adjacent thereto.

10. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with the offset bore in the next adjacent disk, and means for holding said disks assembled as a unit comprising a case having a flat bottom and side walls having a contour corresponding with the contour of the periphery of the disks, the edge of the side walls being turned inwardly over the outermost disk to hold said disks pressed toward said bottom.

11. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with a bore in one disk to a position of alignment with the offset bore in the next adjacent disk, certain of the bores in said disks defining valve seats and movable valve members disposed in said bores to seat upon said seats so defined, and a plurality of buttons, one for each of said valves extending through one of the end disks in the assembly and engageable with the valve to move the same relative to its seat.

12. In a pilot valve structure, a plurality of disks assembled one upon another, each of said disks having a plurality of bores extending therethrough and disposed in spaced relation relative to each other, certain of the bores in one of the disks being alignable with certain of the bores in the next adjacent disk when said disks are disposed in juxtaposed relation to each other and others of the bores in one disk being offset from others of the bores in the adjacent disk when said disks are so disposed, fluid passage means intercommunicating said offset related bores comprising grooves in the faces of the disks extending from a position of alignment with a bore in one disk to a position of alignment with the offset bore in the next adjacent disk, certain of the bores in said disks defining valve seats and movable valve members disposed in said bores to seat upon said seats so defined, a plurality of buttons, one for each of said valves extending through one of the end disks in the assembly and engageable with the valve to move the same relative to its seat, and a resilient plate clamped between said end disk and the next adjacent disk for movably mounting said buttons.

MARION E. MARTIN,
*Administratrix of the Estate of Otis C. Martin, Deceased.*

REFERENCES CITED

The following references are of record in the file of this patent:

UNITED STATES PATENTS

| Number | Name | Date |
| --- | --- | --- |
| 1,976,417 | Steinberg | Oct. 9, 1934 |